March 8, 1966  M. F. O'CONNOR  3,238,643
KINESTHETIC TEACHING DEVICE AND METHOD
Filed March 27, 1964

INVENTOR.
MARTIN F. O'CONNOR
BY Richard von K. Bruns
Atty.

United States Patent Office 3,238,643
Patented Mar. 8, 1966

3,238,643
KINESTHETIC TEACHING DEVICE AND METHOD
Martin F. O'Connor, Munro Road, Camillus, N.Y.
Filed Mar. 27, 1964, Ser. No. 355,204
1 Claim. (Cl. 35—36)

This invention relates to a kinesthetic teaching device and more particularly to a device and method for teaching reading, spelling and writing by means of muscular action required of the pupil.

In the teaching of retarded persons, particularly children, afflicted with alexia, agraphia, or aphasia or those who simply find it difficult to recognize written words or have difficulty with spelling, it has been the practice to teach by means of the sense of touch and/or by muscular action. Those who have difficulty in learning to read or write through seeing a letter or a word written on the blackboard and hearing the name of the letter or pronunciation of the word may be taught by manually tracing a letter or word first written by the teacher.

It has been discovered that, by applying a resistance force impeding the tracing of the word or letter, the muscular "feel" or kinesthetic sense of the pupil is intensified and he learns faster and retains this learning longer than by the usual kinesthetic methods. Interest is enhanced and more care and concentration is required.

The primary object of the invention, accordingly, is to provide a convenient teaching device for requiring more muscular effort in tracing over a written word or letter.

Another important object is to provide a method of teaching writing and letter or word recognition through the muscular senses which is faster than simply by tracing over a pre-written writing.

A further object is to provide a kinesthetic teaching aid which intensifies the muscular sense of the pupil, captures his attention, and increases his concentration.

Other objects and advantages will become apparent from the following description in conjunction with the accompanying drawing, in which.

Figure 1:
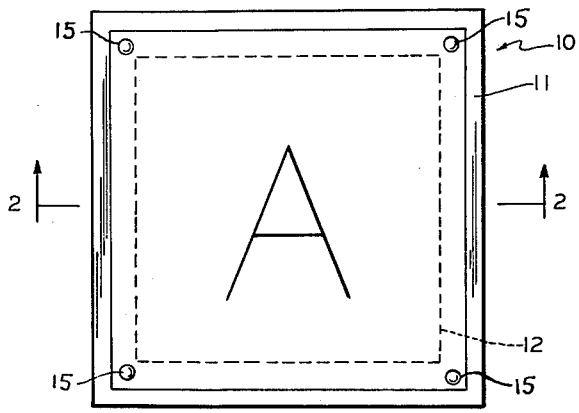
FIGURE 1 is a plan view of a teaching aid according to the invention.
Figure 2:
FIGURE 2 is a sectional view thereof on the line 2—2 of FIGURE 1.

Referring more particularly to FIGURES 1 and 2, a writing board 10 comprises a substantially flat panel of wood or other suitable material 11 and a sheet 12 of steel or other magnetizable material glued or otherwise secured to the panel. The top surface of the panel may be conveniently recessed for the sheet 12, as shown in FIGURE 2, and the sheet 12 secured in the recess by a layer of adhesive 13.

A sheet of paper 14 is secured flat on the panel 11 over the magnetizable sheet 12 by means of thumbtacks 15 or other convenient means. A letter or word, denoted by the letter A, may then be written on the paper 13 by the teacher, in either printed or cursive writing.

Figure 3:
FIGURE 3 is a enlarged side elevational view of a magnetic stylus for use with the teaching aid of FIGURE 1.

A stylus 16, shown in FIGURE 3, is provided for the pupil to use in tracing over the written letter or letters. Stylus 16 is permanently magnetized or electromagnetized as indicated, and is preferably of cobalt or other hard steel which holds its magnetism for a long period of time. One end is rounded, as shown, for providing a smooth surface against the paper 14.

In use, the teacher first writes the word ("word" being hereinafter used to include a single figure, letter or group of letters) on the surface of paper 14 with pencil, crayon or other writing instrument. The pupil then attempts to read the word.

If he fails, the teacher then reads the word and the pupil repeats after the teacher. If more than one letter has been written, the teacher sounds each letter and syllable while pointing to each. The pupil then does the same.

The teacher then guides the pupil's hand holding the magnetized stylus 16 over the writing sounding each letter as it is traced.

The pupil then does the same without guidance by the teacher.

It will be understood that each of the above steps may be repeated one or more times before progressing to the next step. After a fair degree of success the pupil may then attempt to write the same word or letter on another sheet of paper or a slate with an appropriate writing instrument.

Words which the pupil has mastered may be filed or recorded for later use in word-recognition tests or for further work.

Figure 4:
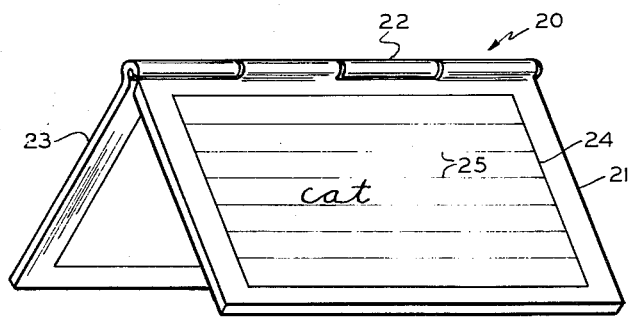
FIGURE 4 is a perspective view of a modified form of writing board.

A modified form of writing board 20 is shown in FIGURE 4 having a panel 21 with a hinged connection along one edge 22 with another panel or cover 23 which may be used to hold the board 20 erect in the manner of an easel.

Panel 21 is provided with a sheet 24 of magnetizable material which may be coated with a writing surface of porcelain-like material. This writing surface is capable of being written on with a wax pencil or crayon and the writing may be easily erased with a cloth or tissue. Lines 25 may be permanently etched or painted on the writing surface as guide lines in writing.

The other panel or cover 23 may conveniently be provided with a slate 26 which the pupil may write on with chalk to test his ability to write.

Figure 5:
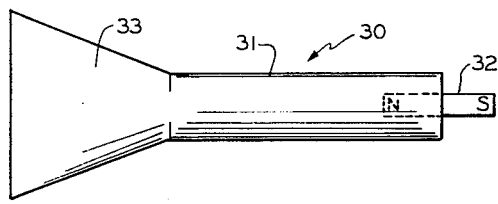
FIGURE 5 is an enlarged side elevational view of a stylus for use with the board of FIGURE 4.
Figure 6:
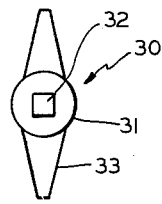
FIGURE 6 is an end view thereof.

In FIGURES 5 and 6 is shown a modified form of stylus 30 having a tubular body 31 of plastic or other suitable material. At one end of the body 31 a permanent magnet or electromagnet 32 is provided imbedded therein with one end projecting as shown. The other end of the body 31 may be provided with a scraper 33 for erasing the waxed pencil writing from the writing surface of the board 24. The projecting end of magnet 32 is used for tracing words written on the coated sheet 24 just as described for the teaching aid shown in FIGURES 1–3.

It has been found that the attraction exerted between the magnetized stylus 16 or 30 and the layer of magnetizable material adjacent the writing surface of boards 10 or 20 provides a magnetic "drag" or impeding force which intensifies the feeling or muscular action in tracing over the word written on the board. It has been observed that the stronger the magnet the better the learning results, barring, of course, the use of a magnet so strong as to cause undue muscular fatigue.

Moreover, the attraction between stylus and board enhances the interest of the pupil and encourages concentration which results in faster and easier learning and greater retention of the lesson learned. It will be understood that the device may equally well be used for normal students especially in the teaching of writing, the kinesthetic sense being used as well as sight and hearing. A writing surface with a permanently magnetized or electromagnetized backing used with a stylus of magnetizable material is equally effective.

As will be apparent to those familiar with the art, the invention may be embodied in other specific forms without departing from the spirit or essential characteristics thereof. The embodiments disclosed are therefore to be considered in all respects as illustrative rather than restrictive, the scope of the invention being indicated by the appended claims.

What is claimed is:

A kinesthetic teaching device comprising: a thin flat continuous surface sheet capable of being written on, a flat solid backing sheet of magnetizable metal material immediately under the surface sheet, a support board on which the surface sheet and backing sheet are secured, and a stylus magnetized at one end for attraction to the backing sheet to perceptibly impede the passage of the end of the stylus over the surface sheet when it is used to trace writing on the surface sheet.

References Cited by the Examiner

UNITED STATES PATENTS

| 611,545 | 9/1898 | Yarnall | 35—66 X |
| 1,931,378 | 10/1933 | Fancher | 35—36 X |
| 2,579,105 | 12/1951 | Baldine | 35—29 |
| 2,589,601 | 3/1952 | Burnett | 35—66 |
| 3,036,388 | 5/1962 | Tate | 35—66 |

EUGENE R. CAPOZIO, *Primary Examiner.*

JEROME SCHNALL, *Examiner.*

W. GRIEB, *Assistant Examiner.*